UNITED STATES PATENT OFFICE.

HIRAM F. SNOW AND JAMES H. DAVIS, OF DOVER, NEW HAMPSHIRE.

IMPROVEMENT IN COMPOUNDS FOR PAINTING AND COATING WOOD.

Specification forming part of Letters Patent No. 143,472, dated October 7, 1873; application filed September 8, 1873.

*To all whom it may concern:*

Be it known that we, HIRAM F. SNOW and JAMES H. DAVIS, of Dover, of the county of Strafford and State of New Hampshire, have invented a new and useful Composition of Matter for use in Painting or Coating Wood or various other substances; and do hereby declare the same to be fully described in the following specification.

In manufacturing the said composition we use the accompanying ingredients in or about in the proportions named—that is to say, eight pounds of dead-oil, (which is the refuse of the evaporation of coal-tar oil, and in commerce is well known under the name dead-oil;) eight pounds of whiting; four pounds of linseed-oil; eight pounds of ground slate, or steatite, or the mineral or earthy equivalent thereof; eighty pounds of coal-tar; four pounds of sal soda in solution with four quarts of water; one pound of rosin or resin dissolved in one-half pint of alcohol, or enough to cut the resin.

In this process of compounding the said ingredients, we usually mix the rosin with the alcohol, and after stirring the mixture we suffer it to stand about half a day, at least, before using it. The whiting, linseed-oil, and the dead-oil, should be mixed together, and afterward should be well strained of impurities, after which the coal-tar is to be added to the mixture, and the whole be well incorporated. Next, the sal-soda solution, and the mineral matter or powdered slate, and the rosinous solution, should be added to the other matters, and the whole should be well stirred, and, if desirable, the composition may be ground in a paint-mill. It will then be fit for use, and will be found to be an excellent and durable paint, the color of which may be varied by the addition of a suitable pigment or pigments.

The solution of rosin not only operates to bring out the color or render it clearer, but prevents subsidence or settling and separation of the heavier matters from the liquid portions of the composition, and particularly such separation while the paint, after having been put on an article, may be in the act of being washed by rain. It also renders the paint more fluent, and with the sal soda improves its fine resisting properties.

The whiting and linseed-oil aid in enabling the coal-tar to hold the powdered slate in solution, and, besides, the whiting answers to advantage as a coloring matter.

In order to obtain a paint of a different color, or one approaching brown or purple, we combine or mix the composition with a quantity of dead-oil, and a sufficient amount of Venetian red; and in order to prevent separation of the ingredients while the composition may be at rest, a small quantity of the alcoholic resinous solution may be added.

We would observe that, in making the composition, it is not necessary to use the ingredients in the exact proportions as set forth, as they may be somewhat varied and still be productive of good results.

We are aware that in making a paint it has been customary, heretofore, to use pulverized slate, coal-oil, and dead-oil, and that coal-tar and Venetian red have been used with dead-oil; also, that ground resin and powdered slate have been mixed into a paste with water, and dried and pulverized, and afterward mixed with coal-tar, sal soda, petroleum, or spirits of turpentine, the same being to constitute a paint, in which case linseed-oil and whiting were not used, as in making our composition.

We therefore claim as our invention—

1. Our said special composition, it consisting of dead-oil, whiting, linseed-oil, ground slate or steatite, coal-tar, sal soda in solution, and resin dissolved in alcohol, made in manner and of the materials as hereinbefore first explained.

2. The combination of such composition with Venetian red and an additional quantity of dead-oil, or with such and a small amount of the alcoholic resinous solution, all as explained.

HIRAM F. SNOW.
JAMES H. DAVIS.

Witnesses:
W. T. PERKINS,
C. S. PERKINS.